United States Patent [19]
Glagola et al.

[11] Patent Number: 5,641,417
[45] Date of Patent: Jun. 24, 1997

[54] METHOD AND APPARATUS FOR GAS TUNGSTEN ARC WELDING TAILORED ALUMINUM BLANKS

[75] Inventors: Michael A. Glagola, Richmond; Eric R. Pickering, Midlothian; Glen A. Taylor, Richmond, all of Va.

[73] Assignee: Reynolds Metals Company, Richmond, Va.

[21] Appl. No.: 451,263

[22] Filed: May 26, 1995

[51] Int. Cl.$^6$ ............................................. B23K 9/167
[52] U.S. Cl. ........................... 219/137 WM; 219/75; 219/136
[58] Field of Search ...................... 219/137 WM, 219/137 R, 72, 74, 75, 125.1, 136

[56] References Cited

U.S. PATENT DOCUMENTS

| | | |
|---|---|---|
| 2,362,505 | 11/1944 | Smith . |
| 3,231,332 | 1/1966 | Jones et al. . |
| 3,251,977 | 5/1966 | McGinty et al. . |
| 3,258,185 | 6/1966 | Koch et al. . |
| 3,287,540 | 11/1966 | Connelly . |
| 3,341,680 | 9/1967 | Rjabov et al. . |
| 3,351,734 | 11/1967 | Arikawa et al. . |
| 3,421,677 | 1/1969 | Jenkins . |
| 3,570,109 | 3/1971 | Harlan et al. . |
| 3,664,816 | 5/1972 | Finnegan . |
| 3,715,561 | 2/1973 | Hammarlind . |
| 3,788,634 | 1/1974 | Chauvet et al. . |
| 3,839,619 | 10/1974 | Normando et al. . |
| 4,019,018 | 4/1977 | Oishi et al. . |
| 4,182,951 | 1/1980 | Kuder . |
| 4,341,944 | 7/1982 | Breen ........................ 219/137 R |
| 4,434,348 | 2/1984 | Reid ............................... 219/75 |
| 4,570,049 | 2/1986 | Albert et al. . |

FOREIGN PATENT DOCUMENTS

| | | | |
|---|---|---|---|
| 53-29245 | 3/1978 | Japan | ........................ 219/72 |
| 53-23846 | 3/1978 | Japan | ........................ 219/74 |

OTHER PUBLICATIONS

"Welding Aluminum: Theory and Practice," The Aluminum Association, second edition, Jun. 1991, pp. 6.14–6.19.

"Welding Kaiser Aluminum," first edition, Kaiser Aluminum & Chemical Sales Inc., 1967, pp. 8–17 to 8–19 and 3–20 to 3–22.

Metals Handbook, vol. 6, Welding and Brazing, eighth edition, American Society for Metals, pp. 113–119.

T. Lyman, Editor, Metals Handbook, 8th Edition, vol. 6, "Welding and Brazing", 1971, pp. 330–331.

*Primary Examiner*—Clifford C. Shaw
*Attorney, Agent, or Firm*—Alan M. Biddison

[57] ABSTRACT

Tailored aluminum blanks, such as structural automotive components, are formed by gas tungsten arc welding a plurality of aluminum or aluminum-alloy sections. Preferably, a backup plate having a shallow longitudinal groove or a plurality of longitudinal grooves and a beveled electrode are employed. A preferred embodiment comprises the use of a multi-torch assembly for initial cleaning and subsequent smoothing of the resulting weld.

39 Claims, 4 Drawing Sheets

METHOD AND APPARATUS FOR GAS TUNGSTEN ARC WELDING TAILORED ALUMINUM BLANKS

TECHNICAL FIELD

The present invention relates to a method and apparatus for forming tailored aluminum blanks by gas tungsten arc welding. The invention has particular applicability in welding aluminum sections having different characteristics to produce structural automotive components.

BACKGROUND ART

Various structural components, such as automotive components, require or desirably exhibit non-uniform characteristics, such as reinforced areas. There has recently evolved a composite article, commonly referred to as a tailored blank, designed to exhibit one or more different characteristics for a specific application, particularly for a structural automotive component. A tailored blank generally comprises sections which differ in one or more characteristics. Tailored blanks are typically subjected to a subsequent operation, such as stamping, to form a particular structural component.

The expression "tailored blank(s)" is understood by those having ordinary skill in the art and employed throughout this application to denote an article(s) comprising joined sections which have one or more different characteristics, preferably different thicknesses, shapes, compositions and/or properties, particularly mechanical, chemical, electrical and/or metallurgical properties. As employed throughout this application, the expression "tailored aluminum blank(s)" denotes tailored blank(s) formed from sections comprising aluminum or an aluminum-based alloy.

Tailored blanks have evolved to satisfy the need for economically manufacturing complex structural components having non-uniform characteristics. Several structural automotive components require reinforcement in certain areas. To satisfy such requirements, a tailored blank is formed by joining sections having different thicknesses or compositions. Typically, the sections are made of steel and joined by welding. In some applications, welded tailored steel blanks are required having welds of up to about 8 feet in length, typically about 2 to about 5 feet. It is difficult to produce such a long weld of steel sections having one or more different characteristics, particular different thickness and compositions, with satisfactory integrity at an economically satisfactory speed, such as about 200 to about 400 inches per minute. The welds must exhibit high quality and be free of imperfections so that the tailored blanks can undergo further forming operations, such as deep drawing and stamping.

There has also evolved the practice of utilizing scrap metal pieces to form complex structural components by welding the scrap pieces. These scrap pieces also typically exhibit one or more different characteristics, such as different thicknesses, compositions, shapes and/or properties. It is also difficult to produce acceptable structural components by welding such scrap metal pieces at an economically satisfactory speed.

Structural automotive components formed of welded tailored steel blanks have met with great success, particularly from an economic standpoint, and demonstrate great promise for further applications. See, for example, "Welded Blanks Tailor Profits," Forming & Fabricating, March 1994, pages 13–17; Wilfred Prange, "Manufacturing and Engineering Tailored Blanks" dated March 1994; and Bob H. Lewinski, "Manufacturing Systems for Tailored Blanks," March 1993. These articles disclose that tailored steel blanks are conventionally formed by laser welding or Mash-seam resistance welding. In Mash-seam resistance welding, the steel sections are subjected to continuous resistance welding and simultaneous forging. Laser welding steel sections to produce tailored steel blanks appears preferred, in that speeds of up to about 400 inches per minute have been achieved. We understand that workers in the art considered tungsten inert gas (TIG) welding undesirable for producing tailored steel blanks, in the belief that steel sections could not be TIG welded at an economically satisfactory speed.

We have recognized the advantages of tailored aluminum blanks formed by welding sections of aluminum or aluminum-alloys, which sections exhibit one or more different characteristics, such as different shapes, thicknesses, compositions and properties, such as mechanical, chemical, electrical, and/or metallurgical properties. We have also recognized the desirability of producing tailored aluminum blanks from scrap aluminum pieces with a manifest attendant economic advantage. However, we are unaware of any heretofore successful attempt to produce welded tailored aluminum blanks, or to produce welded composite aluminum articles from scrap pieces, at an economically satisfactory speed.

It is recognized in the art that techniques generally suited for welding steel can be readily adapted to welding aluminum. Accordingly, we initially believed that the welding techniques conventionally employed to produce welded tailored steel blanks could be readily adapted to produce welded tailored aluminum blanks. However, such expectations have not yet materialized.

The Mash-seam resistance welding technique employed to produce welded tailored steel blanks was not practically adaptable to produce welded tailored aluminum blanks. It was found that the electric currents were excessively high when welding aluminum, attributable to the high electrical conductivity of aluminum. Moreover, the wheels employed in Mash-seam resistance welding became coated with aluminum thereby creating a maintenance problem, attributable to the low softening temperature of aluminum. In addition, unlike steel, aluminum cannot be easily forged, attributable to the narrow plastic range of aluminum.

Attempts made to adapt laser welding to produce welded tailored aluminum blanks also have proven unsuccessful. The weld integrity of the resulting laser welds was found to be inadequate, particularly with respect to ductility. In addition, the resulting laser welds exhibited unacceptable porosity which led to cracking. The laser weld profiles were also inadequate, exhibited undercutting and surface roughness, and contained holes. Attempts to process laser welded tailored aluminum blanks by stamping and stretch forming did not yield acceptable products.

Gas tungsten arc welding (GTAW), previously and still sometimes referred to as TIG welding, is a conventional technique employed to weld various metals, including aluminum. See, for example, "Welding Aluminum: Theory and Practice," The Aluminum Association, second edition, July 1991, pages 6.14–6.19; "Welding Kaiser Aluminum," first edition, Kaiser Aluminum Chemical Sales Inc., 1967, pages 8-17 to 8-19 and 3-20 to 3-22; Metals Handbook, Volume 6, Welding and Brazing, eighth edition, American Society for Metals, pages 113–119. Connelly, U.S. Pat. No. 3,287,540 discloses TIG welding of aluminum sections. Jenkins, U.S. Pat. No. 3,421,677, discloses butt welding aluminum sections having different thicknesses by spraying metal particles. Oishi et al., U.S. Pat. No. 4,019,018, disclose TIG welding aluminum alloys employing particular electrode shapes. Hammarlind, U.S. Pat. No. 3,715,561; Jones et al., U.S. Pat. No. 3,231,332; McGinty et al., U.S. Pat. No. 3,251,977; and Harlan et al., U.S. Pat. No. 3,570,109 relate to the shape of electrodes employed in TIG welding. Arikawa et al., U.S. Pat. No. 3,351,734; Koch et al., U.S. Pat. No. 3,258,185; Normando et al., U.S. Pat. No. 3,839,619; Smith, U.S. Pat. No. 2,362,505; and Kuder, U.S. Pat. No. 4,182,951, relate to the design of a back-up bar or plate employed during welding. Notwithstanding conventional technology relating to welding and welding aluminum, we are unaware of any previous successful attempt to produce welded tailored aluminum blanks or a welded composite comprising aluminum scrap pieces.

DISCLOSURE OF THE INVENTION

An object of the present invention is a method of welding aluminum sections to form a tailored aluminum blank having high weld integrity at an economically acceptable speed.

Another object of the invention is to provide a GTAW apparatus capable of welding aluminum sections to produce a tailored aluminum blank having high weld integrity at an economically acceptable speed.

Additional objects, advantages and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

According to the present invention, the foregoing and other objects are achieved in part by a method of forming a tailored aluminum blank by joining a plurality of aluminum or aluminum-based alloy sections, wherein the sections have one or more different characteristics, comprising positioning the sections in abutting relationship and GTAW welding the sections together in the D.C.-electrode negative mode.

Another aspect of the invention is a method of forming a composite article from a plurality of aluminum and/or aluminum-based alloy scrap pieces by joining the scrap pieces, comprising positioning the scrap pieces in abutting relationship and GTAW the pieces together in the D.C.-electrode negative mode.

A further aspect of the invention is a multi-torch GTAW apparatus comprising, sequentially in the direction of use, a first torch in the D.C.-electrode positive mode and a second torch in the D.C.-electrode negative mode.

Yet another aspect of the present invention is a method of making a structural automotive component comprising positioning a plurality of aluminum or aluminum-based alloy sections, wherein the sections have one or more different characteristics, in abutting relationship, and GTAW the sections together in the D.C.-electrode negative mode to produce a tailored aluminum blank.

A further aspect of the present invention is a method of forming a tailored aluminum blank by joining a plurality of aluminum or aluminum-based alloy sections, wherein the sections have one or more different characteristics, which method comprises positioning the sections in abutting relationship, and passing a multi-torch GTAW apparatus across the sections so that the areas of the abutting sections to be welded are subjected, sequentially, to a first torch operated in the D.C.-electrode positive mode, utilizing a shield gas such as argon, for cleaning and preheating, a second torch operated in the D.C.-electrode negative mode, utilizing a shield gas such as helium, for fusing the abutting sections, and a third torch operated in the A.C. mode, utilizing a shield gas such as argon, for post weld heating to smooth the weld bead and reduce crack sensitivity by slowing down the cooling rate.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

The present invention is directed to forming tailored aluminum blanks, particularly structural automotive components, by GTAW aluminum sections, wherein the sections have at least one or more different characteristics, such as different thicknesses, shapes, compositions and properties, particularly mechanical, chemical, electrical and/ or metallurgical properties. The present invention is also directed to forming composite aluminum articles by GTAW a plurality of aluminum scrap pieces, which pieces may have one or more different characteristics, such as different shapes, thicknesses, compositions and properties. The present invention is further directed to a multi-torch GTAW apparatus comprising a first torch operating in the D.C.-electrode positive mode and a second torch operating in the D.C.-electrode negative mode, and to a GTAW method utilizing the multi-torch apparatus.

Having recognized the utility of tailored aluminum blanks formed by welding aluminum sections exhibiting one or more different characteristics, it was logically believed that the techniques of Mash-seam resistance welding and laser welding, conventionally employed to produce tailored steel blanks with success, could be readily adapted to successfully produce welded tailored aluminum blanks. However, Mash-seam resistance welding could not be successfully adapted to produce tailored aluminum blanks because of the particular characteristics of aluminum, i.e., high electrical conductivity, low melting point and narrow plastic range. It was also found that laser welding aluminum sections having one or more different characteristics to form welded tailored aluminum blanks did not yield adequate weld integrity, particularly with respect to ductility, porosity, undercutting, cracking, surface roughness and holes. The resulting laser welded tailored aluminum blanks could not be successfully subjected to subsequent forming operations such as stamping and stress forming.

After considerable experimentation and investigation, it was found that GTAW could be successfully employed to form welded tailored aluminum blanks exhibiting adequate weld integrity at an unexpectedly heretofore unattainable welding speed. It was particularly unexpected to form tailored aluminum blanks by GTAW at welding speeds of between 100 to about 350 in. per min.

In accordance with the present invention, aluminum and aluminum-based alloy sections are butt-welded by GTAW at welding speeds of 100 to about 350 in. per min. to achieve welds having superior integrity. Moreover, the resulting tailored aluminum blanks can be readily subjected to subsequent forming operations, such as stamping, stretch forming and deep drawing. Thus, by the present invention, complex structural components are formed of tailored aluminum blanks having characteristics tailored or designed for various applications, as in the aerospace and automotive industry, particularly the automotive industry. For example, GTAW is successfully employed in accordance with the present invention to produce structural automotive components such as cross-members, rails, reinforced doors, reinforced wheel houses, wheel houses with integrated shock towers, reinforced floor pans and body side rings.

In accordance with the present invention, aluminum sections having one or more different characteristics, such as different thicknesses, shapes, compositions and/or properties, such as chemical, electrical, mechanical and/or metallurgical properties, are joined by GTAW to produce a welded tailored aluminum blank satisfying a particular structural objective, as in the automotive industry, e.g., reinforcement, strength, optimizing factors such as cost and weight. For example, an aluminum section having a thickness of between about 0.030 to about 0.160 inches is welded by GTAW to an aluminum section having a thickness of between 0.040 to about 0.200 inches. Preferably, the thicker section is not more than about 3 times as thick as the thinner section. Those having ordinary skill in the art should readily recognize that different properties can be achieved by means other than by varying alloying constituents, such as by coatings or mechanical and/or metallurgical processing. For example, aluminum sections having the same compositions can be subjected to different working operations, either hot or cold, to affect various properties.

In another embodiment of the present invention, a complex aluminum article is formed by joining a plurality of scrap aluminum pieces by GTAW, thereby resulting in a considerable economic savings attendant upon utilizing scrap material.

Figure 1:
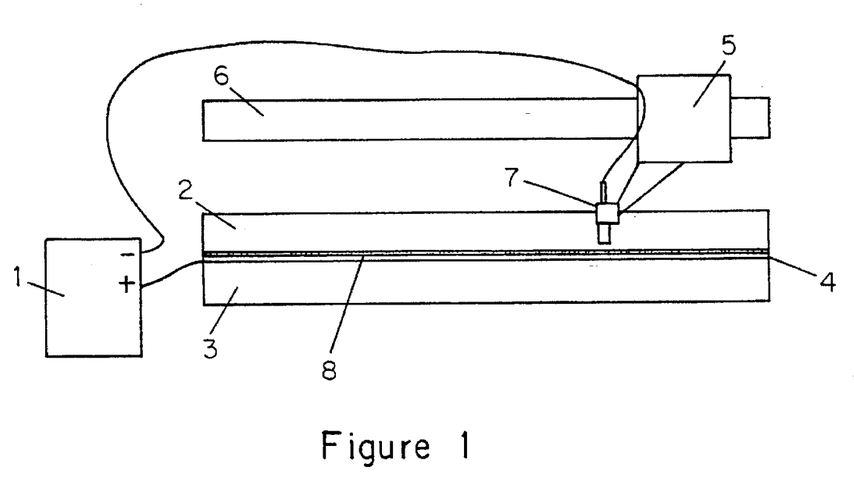
FIG. 1 is a schematic of a high speed welding system for use in the present invention.

Conventional GTAW equipment may be employed to practice the present invention. However, it is preferred to conduct GTAW in the D.C.-electrode negative mode. As shown in FIG. 1, a welding system which can be employed in the present invention comprises GTAW torch 7 extending from traversing carriage or torch holder 5 which traverses on carriage rail 6. GTAW torch 7 is connected to the negative terminal of constant current power supply 1. A work piece 8 is positioned between upper clamp arm 2 and lower clamp arm 3 which is connected to the positive terminal of constant current power supply 1. Backup bar 4 is situated under work piece 8.

Figure 4:
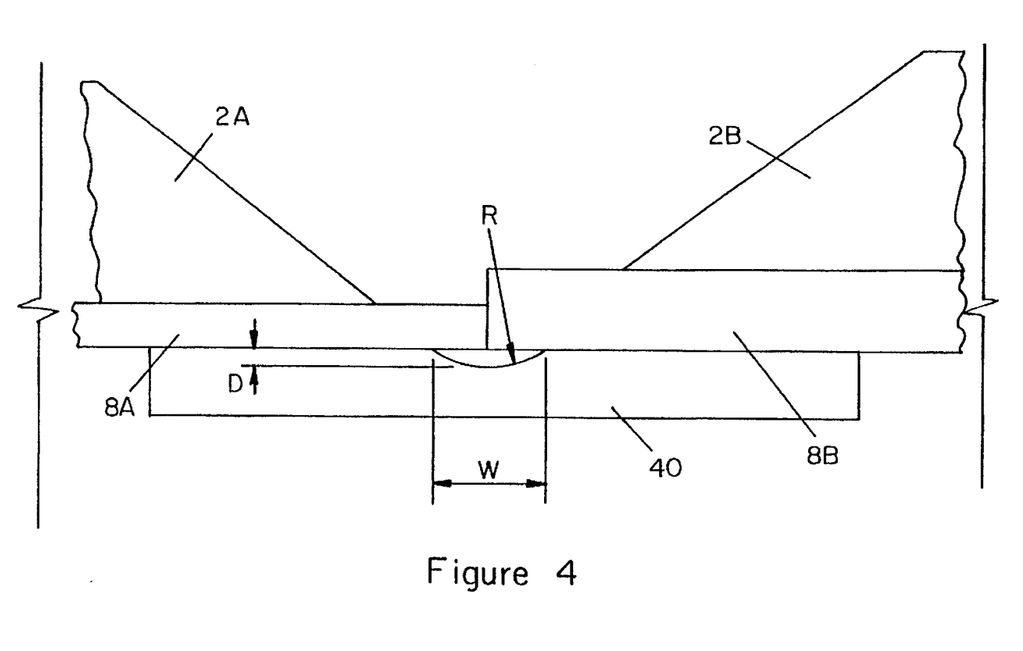
FIG. 4 illustrates a back-up bar for use in the present invention.
Figure 5A:
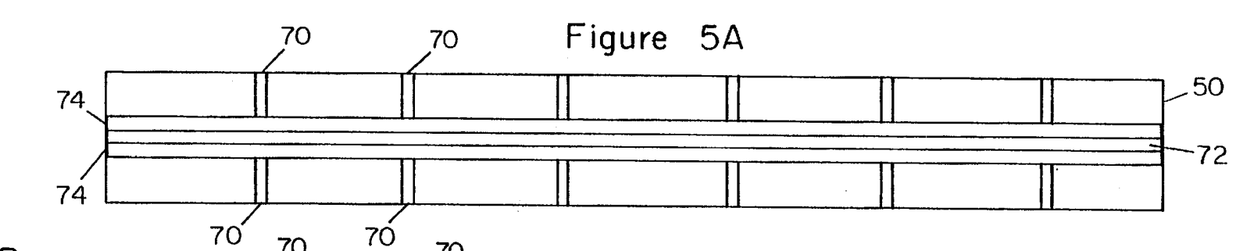
FIGS. 5A–5D are top, end, side and enlarged end views, respectively, of another back-up bar for use in the present invention.
Figure 5B:
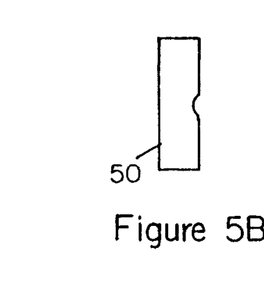
Figure 5C:
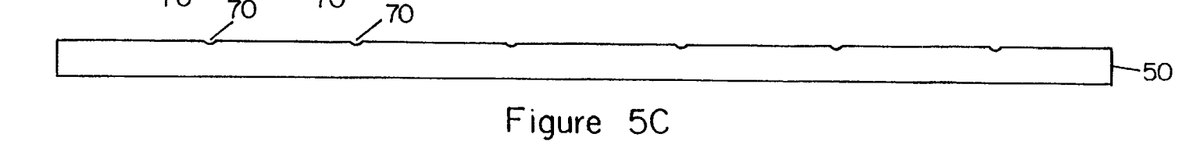
Figure 5D:
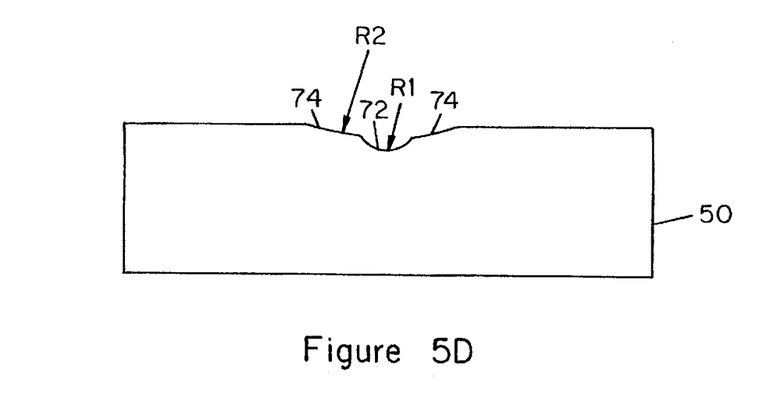

FIG. 4 illustrates an embodiment of the invention in which work pieces 8A and 8B are placed with confronting edges in abutting relationship on back-up bar 40. Clamp 2A secures work piece 8A and clamp 2B secures work piece 8B. Both clamps exert horizontal clamping forces on their associated work pieces. Preferably, at least one of the clamps also exerts a horizontal force urging its associated work piece towards the other work piece to ensure the abutting relationship.

Figure 2A:
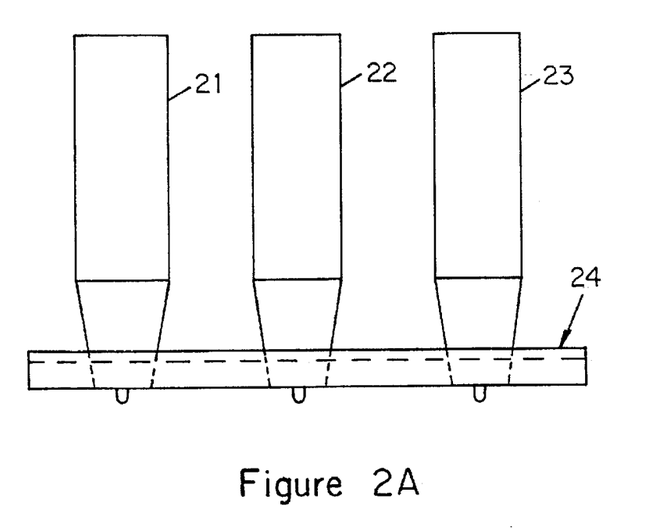
FIG. 2A schematically depicts a multi-torch GTAW apparatus of the present invention.
Figure 2B:
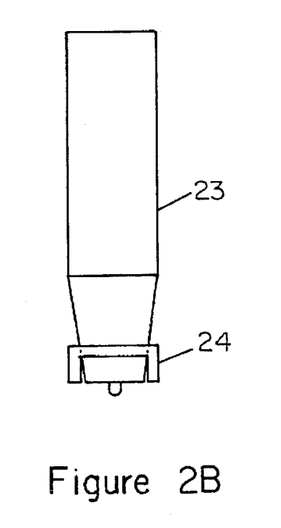
FIG. 2B is an end view of the multi-torch GTAW apparatus of FIG. 2A.

In a particularly preferred embodiment of the present invention, GTAW is conducted employing a multi-torch gas tungsten arc welding apparatus as shown in FIG. 2, which apparatus has been found particularly useful in welding tailored aluminum blanks. As shown in FIG. 2A, torch 21, the first torch positioned sequentially in the direction of use, effects cleaning and preheating of the surfaces to be welded. Torch 21 is operated in the D.C.-electrode positive mode and, preferably, utilizes argon as a shield gas. Torch 21 provides arc removal of oxides and effects preheating which, in turn, reduces current requirement, crack sensitivity, and the amount of argon shield gas. Torch 22 is operated in the D.C.-electrode negative mode and, preferably, utilizes helium as a shield gas. Torch 22 is the primary heat source which effects penetration and fusing of the material to be joined. Torch 23 is operated in the A.C. mode and, preferably, utilizes argon as a shield gas. Torch 23 is utilized for post welding heat treatment to smooth the weld bead and reduce crack sensitivity by slowing down the cooling rate. Shield shroud 24 maintains the inert gas coverage of the weld during the welding pass and prevents oxidation. All torches used in the multi-torch GTAW apparatus of FIGS. 2A and 2B are conventional. However, this embodiment of the present invention comprises assembling such torches in a multitorch GTAW apparatus and adapting them to perform their respective functions discussed above.

Figure 3:
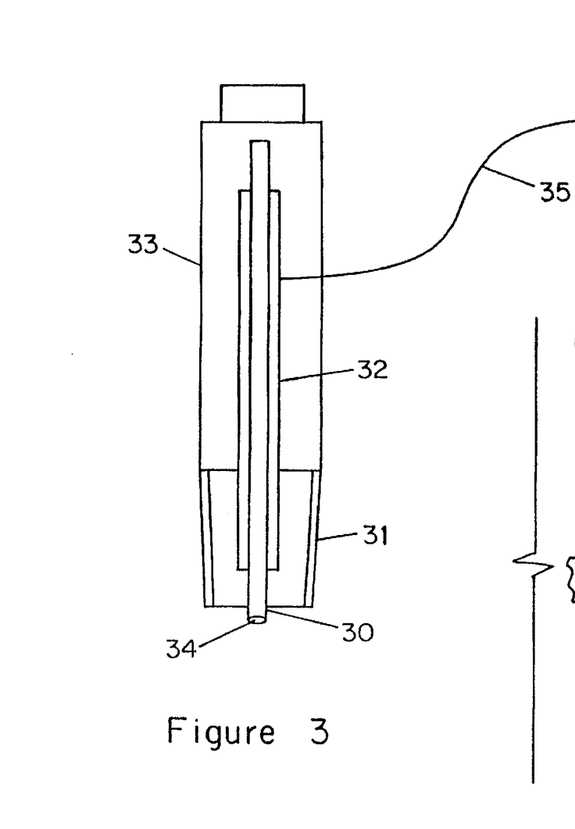
FIG. 3 schematically depicts a typical torch assembly for use in the present invention.

A typical GTAW torch assembly suitable for use in the present invention is illustrated in FIG. 3, wherein ceramic cup 31 extends from torch housing 33, and contact tube 32 extends therein and surrounds tungsten electrode 30, having a preferred beveled tip 34, protruding from ceramic cup 31. Alternatively, the tip may have a generally hemispherical shape. An electrical lead 35 is connected to contact tube 32.

In conducting GTAW process of the present invention, the aluminum sections or pieces to be joined are positioned in abutting relationship and welded, using GTAW in the D.C.-electrode negative mode by passing an electric arc along the edges of the abutting sections to form a weld seam, preferably, autogeneously, i.e., without the use of a separate filler. Preferably, a shield gas, such as helium or argon surrounds the welding tip. In some cases, helium is preferred because of its heat retention properties. It has been found that superior results are achieved by passing the torch along the abutting sections at an angle between about 0° or 5° to about 15° to the sections. In a preferred aspect of this embodiment, the faces of the sections where welding occurs are initially cleaned by passing a torch across the areas to be joined prior to welding. Preferably, cleaning is effected by passing a torch across the areas to be cleaned in the D.C.-electrode positive mode utilizing argon as a shield gas immediately prior to welding.

Cleaning can also be done mechanically or chemically prior to welding.

In another preferred embodiment of the present invention, a post welding heat treating torch is employed in the A.C. mode, preferably utilizing argon as a shield gas, to smooth the weld bead and reduce crack sensitivity by slowing down the cooling rate. In a preferred embodiment of the present invention, GTAW of aluminum sections having one or more different characteristics is conducted to form a tailored aluminum blank utilizing the multi-torch GTAW apparatus shown in FIG. 2, comprising three torches wherein cleaning, welding and post welding heat treatment are effected sequentially with a single apparatus. The use of the apparatus depicted in FIG. 2 advantageously provides a smooth weld and reduces current requirements, crack sensitivity and oxidation.

Advantageously, the GTAW process of the present invention for forming welded tailored aluminum blanks is conducted utilizing a back-up bar with a longitudinal groove as is conventional. However, it was found that when applying GTAW to form tailored aluminum blanks with a conventional back-up bar, the problem of weld bead drop through was encountered, particularly at desirably high welding speeds. When conventionally welding aluminum sections, a back-up bar having a relatively narrow deep longitudinal groove is employed to permit gases to escape, thereby minimizing porosity. However, it was found that when such a longitudinal groove design was used, weld bead drop through occurred resulting in the formation of an undesirable bead on the bottom of the weld. Such a protruding bead adversely affected subsequent forming operations, for example, by causing undue wear on equipment.

After extensive experimentation and investigation, it was found that a relatively wide and shallow longitudinal groove design enabled adequate escape of generated gases while avoiding the weld bead drop through problem. Thus, as shown in FIG. 4, a back-up bar 40 is machined with a longitudinal groove having a radius R of about 0.5 to about 1.5 inches, preferably 1 inch, such that the maximum depth of the groove D is about 0.005 to about 0.015 inches, preferably about 0.005 inches. In accordance with a preferred embodiment, a groove width W of about 0.150 to about 0.300 inches is formed, most preferably about 0.200 inches. Optimally, the underside weld reinforcement, which is the distance immediately under the weld seam, is about 0.003 to about 0.010 inches, preferably about 0.003 inches.

Figure 6:
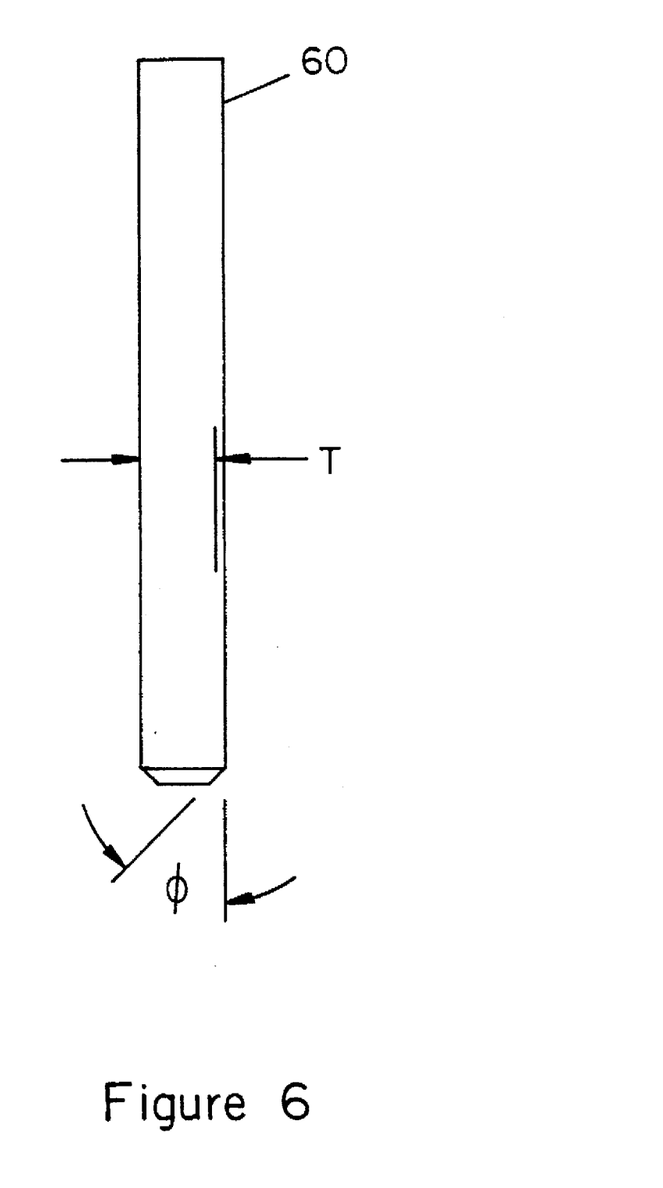
FIG. 6 illustrates a preferred electrode design for use in the present invention.

In a particularly preferred embodiment, a back-up bar 50 as shown in FIGS. 5A-5D is employed comprising a first longitudinal groove having a radius R1 of about 0.1 inches to about 0.5 inches, preferably about 0.125 inches to about 0.25 inches. In addition, a second longitudinal groove, having a radius R2 of about 0.5 to about 1.5 inches, preferably about 0.5 to about 1.0 inch is provided on each side of the first longitudinal groove. It was found that the second longitudinal grooves improved the GTAW process by allowing the air underneath the weld to escape more easily, thereby providing better underside shielding. A plurality of grooves 70 are formed in the back-up bar 50 that extend transversely to the first longitudinal groove 72 and the second longitudinal grooves 74/and cooperate with the first and second grooves to enable escape of gases generated during welding. In another preferred embodiment of the present invention, particularly when welding aluminum sections having different thicknesses, a tungsten electrode 60 as shown in FIG. 6 is employed, having its welding tip beveled at an angle φ of about 30° to about 60°, preferably about 45°. Typically, the thickness T of the electrode is about 0.0937 to about 0.125 inches, preferably about 0.09 to about 0.125 inches.

It was found that by employing GTAW in accordance with the present invention to weld aluminum sections, high speeds of about 150 in. per min. to about 350 in. per min. are unexpectedly achieved. Thus, by the present invention, it was found that Aluminum Association series 6000 aluminum alloys were successfully joined to series 5000 aluminum alloys by GTAW at high welding speeds of about 100 to about 200 in. per. min. to form tailored aluminum blanks having high integrity welds. Similarly, series 5000 aluminum alloy sections were successfully welded to series 2000 aluminum alloy sections, and series 6000 aluminum alloy sections were successfully welded to 2000 series aluminum alloy sections, at unexpectedly high welding speeds and with filler metal additions.

The GTAW process of the present invention to form welded tailored aluminum blanks or composite aluminum articles is not limited to any particular GTAW torch assembly, back-up bar, or electrode configuration, but can be successfully practiced with conventional GTAW technology and equipment. It was unexpectedly discovered that the application of conventional GTAW technology and the inventive process and apparatus disclosed herein allowed the formation of tailored aluminum blanks with high integrity welds at heretofore unattainable welding speeds, and the resulting welded tailored aluminum blanks successfully could be subjected to further operations such as stamping, stretch forming and deep drawing. The tailored aluminum blanks produced in accordance with the present invention can be employed in various industries, such as the aerospace industry and, preferably, the automotive industry.

Only the preferred embodiment of the present invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A method of forming a tailored aluminum blank by joining a plurality of aluminum or aluminum-based alloy sections, the blank being subjected to a subsequent forming operation to provide an article, wherein the sections have one or more different characteristics, which method comprises:

positioning the sections on a back-up bar having a relatively wide and shallow longitudinal groove formed therein, with confronting edges of the sections positioned in abutting relationship above the longitudinal groove; and gas tungsten arc welding the sections together in the D.C.-electrode negative mode, the back-up bar having grooves extending transversely to the longitudinal groove and cooperating with the longitudinal groove to allow escape of gases generated during welding.

2. The method according to claim 1, further comprising stamping the tailored aluminum blank into a structural component.

3. The method according to claim 2, wherein the structural component is an automotive component.

4. The method according to claim 3, wherein the automotive structural component is selected from the group consisting of cross-members, rails, reinforced doors, reinforced wheel houses, wheel houses with integrated shock towers, reinforced floor pans and body side rings.

5. The method according to claim 1, comprising moving an electric arc along edges of the abutting sections to form a weld seam.

6. The method according to claim 1, comprising gas tungsten arc welding the sections autogeneously.

7. The method according to claim 1, comprising gas tungsten arc welding sections having at least one of different thicknesses, compositions, shapes, and properties.

8. The method according to claim 7, comprising gas tungsten arc welding sections having different thicknesses.

9. The method according to claim 7, comprising gas tungsten arc welding sections having different compositions.

10. The method according to claim 7, comprising gas tungsten arc welding sections having at least one of different mechanical, chemical, electrical and metallurgical properties.

11. The method according to claim 7, comprising gas tungsten arc welding sections having different shapes.

12. The method according to claim 1, comprising gas tungsten arc welding sections of different aluminum alloys.

13. The method according to claim 12, comprising gas tungsten arc welding a 6000 series aluminum alloy section to a 5000 series aluminum alloy section.

14. The method according to claim 12, comprising gas tungsten arc welding a 5000 series aluminum alloy section to a 2000 series aluminum alloy section.

15. The method according to claim 12, comprising welding a 6000 series aluminum alloy section to a 2000 series aluminum alloy section.

16. The method according to claim 1, comprising gas tungsten arc welding sections to produce a weld seam having a length of 6 inches to about 100 inches.

17. The method according to claim 1, comprising abutting two sections on a back-up bar containing a first longitudinal groove, and gas tungsten arc welding the sections in a longitudinal direction parallel to and above the longitudinal groove.

18. The method according to claim 17, wherein the groove has a radius of about 0.5 to about 1.5 inches and a maximum depth of not more than about 0.020 inches.

19. The method according to claim 18, wherein the groove has a maximum depth of about 0.005 inches.

20. The method according to claim 18, wherein the groove has a width of about 0.250 inches.

21. The method according to claim 18, wherein the groove has an underside weld reinforcement of about 0.003 inches.

22. The method according to claim 17, wherein the back-up bar further contains a second longitudinal groove on each side of the first longitudinal groove, wherein each second longitudinal groove has a radius of about 0.5 to about 1 inches, and the first longitudinal groove has a radius of about 0.125 to about 0.25 inches.

23. The method according to claim 1, comprising gas tungsten arc welding sections with an electrode beveled at an angle of about 30° to about 60°.

24. The method according to claim 23, wherein the electrode is beveled at an angle of about 45°.

25. The method according to claim 24, wherein the electrode has a hemispherical tip.

26. The method according to claim 1, comprising passing a welding torch along the abutting sections at an angle of about 5° to about 15° to the abutted sections.

27. The method according to claim 1, comprising passing a torch along the abutting sections at a speed of about 200 to about 300 inches per minute.

28. The method according to claim 1, further comprising cleaning by heating the areas of the sections to be welded, prior to welding, with a gas tungsten arc welding torch in the D.C.-electrode positive mode.

29. The method according to claim 28, further comprising heating the resulting weld with a gas tungsten arc welding torch in the A.C. mode.

30. The method according to claim 1, further comprising heating the resulting weld with a gas tungsten arc welding torch in the A.C. mode.

31. A method of forming a composite article from a plurality of at least one of aluminum and aluminum-based alloy scrap pieces by joining the scrap pieces, which method comprises:

positioning the scrap pieces on a back-up bar having a longitudinally-extending groove formed therein, with confronting edges of the pieces to be joined positioned in abutting relationship above the groove; and gas tungsten arc welding the pieces together in the D.C.-electrode negative mode, the back-up bar having additional grooves formed therein that cooperate with the longitudinally-extending groove to enable escape of gases generated during welding.

32. The method according to claim 31, comprising gas tungsten arc welding scrap pieces having one or more different characteristics.

33. The method according to claim 31, comprising gas tungsten arc welding scrap pieces having at least one of different thicknesses, shapes, compositions and properties.

34. The method according to claim 31, further comprising cleaning, by heating, the areas of the pieces to be welded, prior to welding, with a gas tungsten arc welding torch in the D.C.-electrode positive mode.

35. The method according to claim 34, further comprising heating the resulting weld with a gas tungsten arc welding torch in the A.C. mode.

36. A method of making a structural automotive component comprising:

positioning a plurality of aluminum or aluminum-based alloy sections, wherein the sections have one or more different characteristics, in abutting relationship on a back-up bar having a relatively wide and shallow longitudinally-extending groove formed therein, with abutting edges of the sections to be joined positioned above the groove; and gas tungsten arc welding the sections together in the D.C.-electrode negative mode to produce a tailored aluminum blank having a weld bead projecting from a lower surface thereof sufficiently small so as to allow subsequent stamping operations.

37. The method according to claim 36, further comprising stamping the tailored aluminum blank.

38. The method according to claim 36, wherein the structural automotive component is selected from the group consisting of cross-members, rails, reinforced doors, reinforced wheel houses, wheel houses with integrated shock towers, reinforced floor pans and body side rings.

39. A method of forming a tailored aluminum blank by joining a plurality of aluminum or aluminum-based alloy sections, wherein the sections have one or more different characteristics, which method comprises:

positioning the sections in abutting relationship on a back-up bar having a relatively wide and shallow longitudinally-extending groove formed therein for enabling escape of gases generated during welding, confronting edges of the sections to be welded being positioned above said groove, the maximum depth of said groove being sized so that the maximum underside weld reinforcement projects from the bottom surface of the blank not more than about 0.01 inches; and passing a multi-torch gas tungsten arc welding apparatus across the sections so that areas of the abutting sections to be welded are subjected, sequentially to:
- a first torch operated in the D.C.-electrode positive mode, utilizing argon as a shield gas, for cleaning and preheating,
- a second torch operated in the D.C.-electrode negative mode, utilizing helium as a shield gas, for fusing the abutting sections; and
- a third torch operated in the A.C. mode, utilizing argon as a shield gas, for post weld heating to smooth the weld bead and reduce crack sensitivity by slowing down the cooling rate.

* * * * *